Oct. 30, 1923. 1,472,119
T. J. FAIRLEY
PROCESS OF TREATING VEGETABLE MATTER FOR THE PRODUCTION OR
EXTRACTION OF OILS, RESINOUS SUBSTANCES, ETC
Filed May 8, 1922
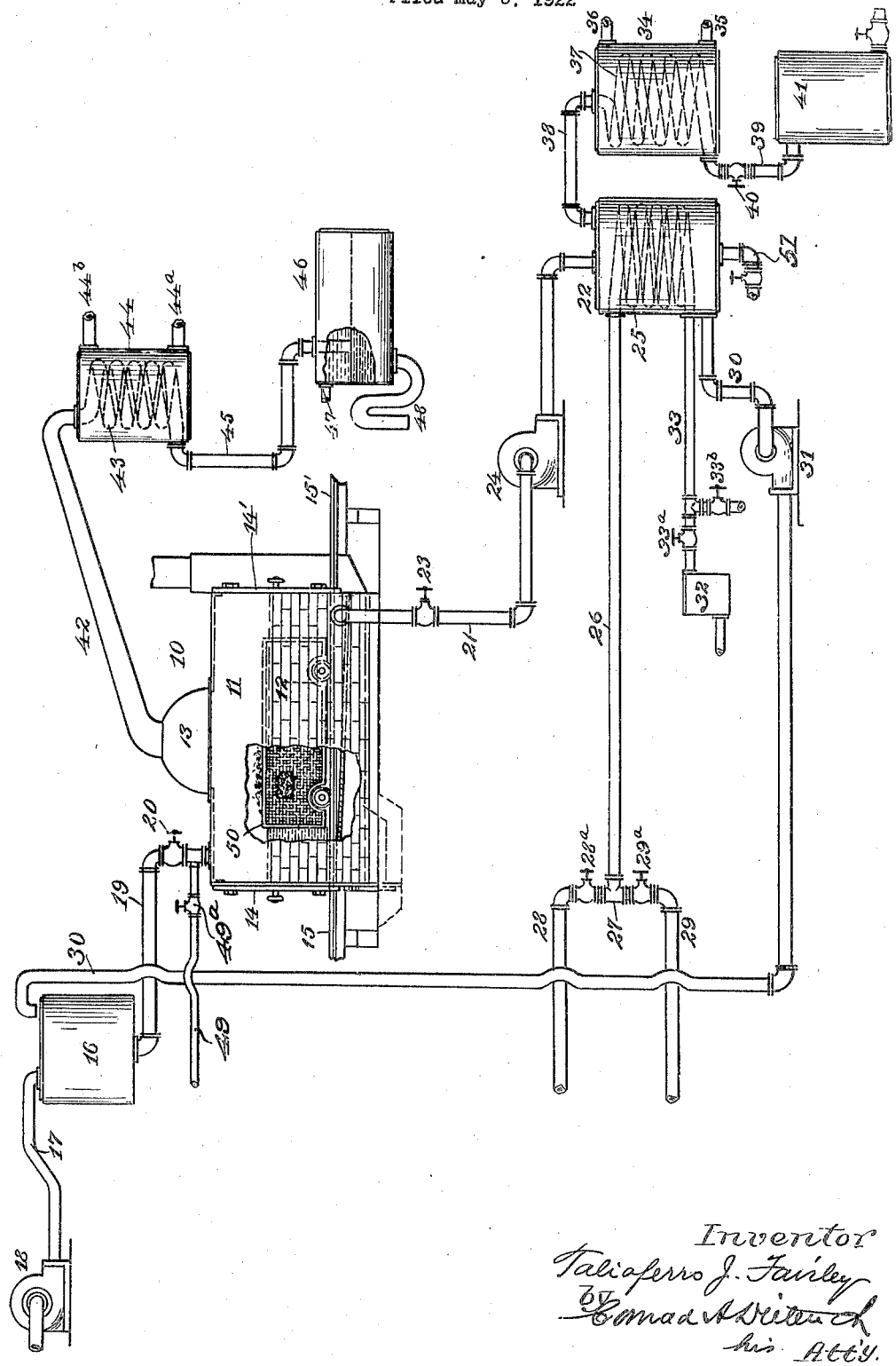

Patented Oct. 30, 1923.

1,472,119

UNITED STATES PATENT OFFICE.

TALIAFERRO J. FAIRLEY, OF HATTIESBURG, MISSISSIPPI.

PROCESS OF TREATING VEGETABLE MATTER FOR THE PRODUCTION OR EXTRACTION OF OILS, RESINOUS SUBSTANCES, ETC.

Application filed May 8, 1922. Serial No. 559,418.

*To all whom it may concern:*

Be it known that I, TALIAFERRO J. FAIRLEY, a citizen of the United States, residing at Hattiesburg, Forrest County, in the State of Mississippi, have invented certain new and useful Improvements in Processes of Treating Vegetable Matter for the Production or Extraction of Oils, Resinous Substances, Etc., of which the following is a full, clear, and exact specification.

My invention relates to improvements in the process of extracting oil and other volatile or non-volatile fluids from vegetable matter or growths, and the same has for its object to provide a simple, efficient and economical process of extracting the resinous, essential and other oils, acids, alcohol, aldehydes, phenols, esters, ketones, etc., and compounds or derivatives thereof, from woods, shrubs, plants, seeds, berries, grain, nuts, etc.

Further, said invention has for its object to provide a process for extracting oils and other volatile or non-volatile fluids from vegetable growths by means of which the yield of such fluids may be greatly increased over that obtained by present methods.

Further, said invention has for its object to provide a process for obtaining oils and other volatile and non-volatile fluids from vegetable matter or growths and from the medium employed in the treatment of such matter to effect the extraction recovery or production thereof.

Further, said invention has for its object to provide a process for the purposes specified by means of which the time necessary to effect the extraction recovery or production of such oils, fluids and compounds or derivatives thereof may be greatly reduced.

Further, said invention has for its object to provide a process for the purposes specified by means of which the carbon, normally occurring as a solid charcoal, of the same approximate form as the wood or vegetable matter treated and resulting from the destructive distillation of the vegetable matter is wholly reduced to such a fine state of sub-division as to cause the same to be held in suspension in the heavier liquids of the mass which are not permitted to become vaporized.

Further, said invention has for its object to provide a process in which the time required for the treatment of a charge is materially shortened by reason of the fact that the solid carbon in the form of dry charcoal is avoided and the carbon present disintegrated to such a state of fineness as to permit of the same being suspended in the heavier liquids of the mass, which are not permitted to become vaporized, and which are drained from the retort, thereby eliminating the necessity for cooling the charcoal which ordinarily occurs in destructive distillation.

Further, said invention has for its object to provide a process for the cracking or decomposition of the heavy specific gravity and high boiling point liquid of the bath immersing the wood, into light gravity and lower boiling point oils and other volatile and non-volatile fluids, which may have many of the same physical and chemical properties as ordinary destructive wood turpentine and pine oil.

Other objects will in part be obvious, and in part be pointed out hereinafter.

To the attainment of the aforesaid objects and ends, my invention consists in the process embodying the successive steps hereinafter more fully described and then pointed out in the claims.

In the accompanying drawing, I have shown diagrammatically one form of apparatus for carrying out my process.

For convenience, I shall describe my said process in connection with extracting pine oil and other fluids from pine wood, it being, of course, understood that the invention is not limited thereto, but is applicable to the treatment of all vegetable matter or growths, such as woods, shrubs, seeds, berries, grains, nuts, etc., in order to extract the valuable oils, liquids and other fluids therefrom.

In said drawings, 10 designates a suitable retort comprising a metal container 11 mounted in brick-work 12, and having its upper portion and dome 13 exposed. By preference, the container 11 is provided at its opposite ends with removable or hinged headers or doors 14, 14′, and within said container is provided a track connecting with the track portions 15, 15′ arranged without the container 11.

16 denotes a feed tank containing oil or other suitable liquid. The tank 16 is connected by a pipe 17 and pump 18 with a source of liquid supply, and a discharge pipe 19 extending to the top of the retort 11. The pipe 19 is provided with a valve 20. 21 denotes a draw-off pipe extending from the lowermost part of the container 11 to the top of a container 22. The pipe 21 is provided with a valve 23 and pump 24. Within the container 22 is disposed a heat-exchange coil 25 having its upper end connected by a pipe 26 to a coupling 27, of which one end is connected by a pipe 28 with a source of cold water or other cooling medium, and of which the other end is connected by a pipe 29 with a source of steam supply. The coupling 27 is provided at its water inlet side with a valve 28$^a$, and at its steam inlet side with a valve 29$^a$ whereby to control the admission of the heating or cooling medium to the coil 25.

30 denotes a pipe extending from the base of the container 22 to a point above the tank 16, which pipe is provided with a pump 31 for returning the liquid from the container 22 to tank 16 to be reused.

The outlet end of the coil 25 may also be provided with a steam trap 32 connected by a pipe 33 having valves 33$^a$, 33$^b$ therein.

34 denotes a condenser having its inlet 35 and outlet 36 connected to a suitable source of water supply or other cooling medium. The coil 37 of the condenser 34 is connected at its upper end by a pipe 38 to the top of the container 22, and its lower end by a pipe 39, which is provided with a valve 40, to the top of a collecting tank 41.

From the top of the dome 13 extends a gas or vapor pipe 42 which is connected to the upper or intake end of a condenser coil 43 arranged within condenser 44, having an inlet 44$^a$ at its base, and an outlet 44$^b$ at its top. The outlet end of the coil 43 is connected to a pipe 45 which extends into a separator 46 having an oil draw-off 47 adjacent to its upper end, and a goose-neck 48 which is secured to the base of said separator 46 and extends upwardly at one side thereof, and serves to maintain a fixed water level in said separator.

49 denotes a pipe extending from a source of steam supply to the top of the container 10, and provided with a valve 49$^a$.

In carrying out my process, the operation is as follows:

For the purposes of this description, the operation is presumed to be in connection with a total of ten thousand pounds of long leaf pine chips treated in lots of 1,000 pounds each, the first of said lots having approximately an equal weight of fluid added thereto, as hereinafter described.

The wood is first subjected to the action of a hog, or other suitable apparatus, and reduced to chips of the desired degree of fineness. The chips are then placed in metal cars or baskets each containing about one thousand pounds of chips. The cars or baskets 50 are mounted upon wheels working on tracks 15, 15′ and rolled into the container 11 of the retort 10.

The doors 14 and 14′ are then closed and secured in place, and the valve 23 in the pipe 21 closed, and the valve 20 in the pipe 19 extending from the tank 16 opened, and an amount of the fluid approximately equivalent in weight to that of the chips introduced into said container 11. (The fluid, for example, consists of pine oil, pine tar oil, pine tar, or light residuum pine pitch, or a suitable mixture thereof.) The quantity of the liquid permitted to enter the container 11 should be sufficient to about cover the chips in the basket or car 50. In filling the container 11, it is not always necessary to cover the top of the basket or car 50, as the wood chips or material therein contain an amount of water or moisture which will be released when the wood chips are heated and thus cause the liquid to foam and the level thereof to rise somewhat as a result of such foaming and the increase of temperature.

The heat applied to the retort 10 by burning fuel under the container 11 will heat the mass and cause the more volatile oils and liquids present in the mass to pass through the dome 13, and pipe 42 to the condenser coil 43, where the gaseous fluids will be condensed, and the condensate consisting of light gravity oils, wood turpentine, pine oil, pine tar oil, water containing pyroligneous acid, and methyl alcohol, delivered by the pipe 45 to the separator 46. From the separator 46 the water may be drawn off by the gooseneck 48, and the oils by the pipe 47.

The upper portion of the container 11, the dome 13 and the pipe 42 may be wholly or partially exposed directly to the atmosphere, in order to provide sufficient condensing surface to insure the condensation of the vapors of the oils or liquids possessing a high boiling point which would otherwise be carried over with the more volatile liquids should the temperature within the retort be raised too quickly. The pipe 42 should be inclined upwardly in order to return to the container 11 all condensate formed up to this point. It is desirable to prevent as far as possible the diminution in volume of the heavier liquids in order to insure the maintaining of the fluid level within the container 11 at such height as will cover completely the chips contained in the car or basket 50. It is essential that the fluid within the container 11 be capable of acquiring and withstanding a temperature of substantially 700° F. without causing any appreciable diminution in the volume of said fluid, i. e., to such an extent as will expose the chips in the container.

The mass within the container 11 is subjected to the action of direct heat of the fuel burned under the retort for about four hours. Upon raising the temperature of the mass within the container 11 to about 200° F., the lighter volatile liquids begin to vaporize and pass over into the condenser 43. The temperature within the retort 10 is raised from approximately 200° F. to 700° F. during a period of approximately three hours, the maximum temperature being maintained for about one hour in addition to the three hours specified.

At the expiration of said period of one hour, after reaching 700° F., all of the desired volatile oils or fluids, namely, the light gravity oil, wood turpentine, pine oil, (and unless care is taken in raising and holding the temperature, within the container, some pine tar oil, which is not desired as a distillation product at this period), with varying amounts of water carrying a certain amount of crude pyroligneous acid and methyl alcohol will have been vaporized and passed through the condenser 43. At the same time, all of the original solid chips within the container 11 will have been reduced to such a fine state of sub-division as to cause the same to be suspended in the oil or fluid remaining in the retort.

At this period, the valve 23 in the pipe 21 is opened and the liquid remaining in the container 11 (which consists of that portion of the original pine oil, pine tar, oil, pine tar residuum pitch, or any mixture thereof which has not been vaporized, cracked or decomposed into lower boiling point oils, together with the resinous matter which has been given up by the wood due to the heat treatment, plus the carbonaceous matter which has been reduced to such degree of fineness as a result of the treatment of the mass within the retort 11 as to cause the same to be suspended in the liquid, is drained off or pumped through the pump 24 to the container 22, which is connected by a vapor outlet pipe 38 to a condenser 37 where any volatile matter which may be given off at this temperature (700° F.) is liquefied and conveyed by a pipe 39 into the collecting tank 41.

The container 22 is provided with a coil 25 and pipe 26 whereby said coil 25 may be placed in communication with either the water pipe 28 or steam pipe 29 by actuating the valves 28ᵃ, 29ᵃ, respectively, in order to raise or lower the temperature of the fluid within the container 22, as may be required.

In order to shorten the heating period for the mass within container 11, the temperature of the fluid in the container 22 may be raised or lowered to such degree as will insure its delivery to the container 11 by means of the pipe 30 and pump 31 to the storage tank 16 at substantially 200° F.

Before the liquid in the container 22 is returned to the storage tank 16, its character should be ascertained in order to determine whether the same is sufficiently liquid at 200° F. to permit of its advantageous reuse in the container 11, experience having shown that after it has reached the stage where its appearance is similar to brittle pitch at a temperature of 70° F. to 80° F., there is likelihood of the formation of considerable coke at the maximum temperature existing in the container 11. For this reason, it may be necessary to discard the liquid drawn from the container 22 when it reaches this condition, in which event it may be drained through the valved discharge outlet 51 to any suitable collecting receptacle or shipping packages, or it may be returned to the storage tank 16 and mixed with some fresh liquid supplied by the pipe 17 to said tank, or the same may be partly used or partly discarded as the conditions require.

As soon as the container 11 is wholly emptied of the liquid, a current of live steam is forced into the same in order to remove all vapors and gases which may have remained in said retort.

Hereupon, the doors 14, 14′ are opened, the car or basket 50 (which may contain a small or negligible quantity of soft, oil soaked charcoal which has not entirely disappeared) is withdrawn through the door 14′, and a fresh car or basket 50 introduced through the door 14. The doors 14, 14′ are then again closed and the operation above described repeated, and so on. The oil soaked charcoal remaining in the basket 50 after the operation above described may be permitted to remain in the basket and be introduced into the retort with a fresh charge of chips; the succeeding operations causing the quantity thereof to be reduced and finally entirely disappear in the same manner as above described.

The treatment of 10000 pounds of long leaf pine chips preferably in ten successive lots of about 1,000 pounds each as hereinabove described, in the course of which 2241 pounds of pine tar oil is added from time to time, in addition to the 1,000 pounds of pine tar oil originally introduced, will result in the production or recovery of the following crude products, in the proportion specified—

| | Pounds. |
|---|---|
| Oils through condenser | 3599 |
| Water layer through condenser | 2914 |
| Pitch drained from retort | 5321 |
| Non-condensible vapors | 1007 |
| Dross, carbon and coke left in retort | 400 |
| | 13241 |

The refining of the oils from the condenser, results in the further separation of water, and the formation of gases lost in the process of refining, so that the final products resulting from a total of 13241 pounds consisting of 10000 pounds of wood chips and 3241 pounds of added tar oil amount to—

|  | Pounds. | Gals. |
|---|---|---|
| Light gravity oil | 79 = | 11 |
| Turpentine | 610 = | 85 |
| Pine oil | 732 = | 94 |
| Tar oil | 750 = | 84 |
| Pitch | 6141 | |
| Water | 3315 | |
| Gases (lost) | 1214 | |
| Dross, etc. | 400 | |
| Total | 13241 | |

The subsequent distillation of the 6141 pounds of pitch, noted above, results in the following products:

|  | Pounds. |
|---|---|
| Pine tar oil | 3378 |
| Coke (carbon residue) | 2270 |
| Moisture and loss by distillation | 493 |
| Total | 6141 |

We thus find that we have both produced and recovered 3378 pounds, plus the 750 pounds of pine tar oil, above specified or a total of 4128 pounds of the same relative consistency as the 3241 pounds, comprising the 1,000 pounds started with plus the 2241 pounds added from time to time in the course of the operation, resulting in the actual production of 887 pounds of pine tar oil, which amount represents the difference between 4128 pounds and 3241 pounds of pine tar oil specified. The production of oils alone from the 10,000 pounds of chipped pine wood is therefore as follows:

|  | Pounds. |
|---|---|
| Light gravity oils | 79 |
| Wood turpentine | 610 |
| Pine oil | 732 |
| Pine tar oil | 887 |
| Total | 2308 |

This amounts to a production or yield per ton of 2,000 pounds of wood chips of

|  | Pounds. | Gal. |
|---|---|---|
| Light gravity oils | 16 = | 2.3 |
| Turpentine | 122 = | 16.7 |
| Pine oil | 146 = | 20.0 |
| Pine tar oil | 177 = | 21.0 |
| Total | | 60.0 |

The total oils produced per ton of wood thus treated, having boiling points and specific gravities up to and including the upper limits of pine oil, amounts to 39 gallons, whereas by the ordinary destructive distillation process the production or yield of these same grades of oil amounts to not more than 15 gallons per ton of wood treated.

It will thus be seen that according to my process, a gain of more than twice the volume of oil products within the range of turpentine and pine oil will be obtained, and that the time of operation is reduced from about 24 hours to about 6 hours.

Further, it will of course be understood that while I have described my process in connection with the production or extraction of wood turpentine, pine oil and other heavier oils from pine wood, and from the cracking of the heavier oils of the bath surrounding the chipped pine wood into oils having similar physical and chemical qualities to wood turpentine, pine oil and other heavier oils, that the invention is not limited thereto, but is equally applicable in connection with the production or extraction of oils and the like from other vegetable growths or matters, and from the heavy oils or liquids of the bath surrounding said vegetable growth or matter to be treated.

Having thus described my said invention what I claim and desire to secure by Letters Patent is:

1. The process of treating vegetable matter to obtain oil and other fluids therefrom, which consists in reducing said matter to appropriate size or form, immersing the same in a closed container in a liquid of vegetable origin, capable of withstanding the degree of heat necessary to effect the destructive distillation of said vegetable matter without reducing the volume of said liquid to an extent which will expose said vegetable matter, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constitutents of the mass into condensible fluids, condensing said fluids, and finally separating the aqueous layer from the oleaginous constituents of said condensate, substantially as specified.

2. The process of treating vegetable matter to obtain oil and other fluids therefrom, which consists in reducing such matter to appropriate size or form, immersing the same in a closed container in an equal weight of liquid of vegetable origin, capable of withstanding the degree of heat necessary to effect the destructive distillation of said vegetable matter without reducing the volume of said liquid to an extent which will expose said vegetable matter, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating the aqueous layer of the oleaginous constituents of said condensate, substantially as specified.

3. The process of treating vegetable matter to obtain oil and other fluids therefrom, which consists in reducing such matter to appropriate size or form, immersing the same in a closed container in a liquid of vegetable origin having a sufficiently high boiling point to withstand the heat necessary to effect the destructive distillation of said vegetable matter without reducing the volume of said liquid to an extent which will expose said vegetable matter, subjecting the same to the action of heat to effect the destructive distillation of said vegetable matter, and to cause the reduction of the solid carbonaceous material to such state of fine sub-division as to cause said carbonaceous matter to become suspended in said liquid converting the volatilizable constituents of the mass into condensible fluids, condensing said fluids, and finally separating the aqueous layer from the oleaginous constituents of said condensate, substantially as specified.

4. The process of treating vegetable matter to obtain oil and other fluids therefrom, which consists in reducing said matter to appropriate size or form, immersing the same in a closed container in a liquid of vegetable origin capable of withstanding the degree of heat necessary to effect the destructive distillation of said vegetable matter without reducing the volume of said liquid to an extent which will expose said vegetable matter, and consisting essentially of the same substances as that of the matter to be obtained from said mass, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating the aqueous layer from the oleaginous constituents of said condensate, substantially as specified.

5. The process of treating vegetable matter to obtain oil and other fluids therefrom, which consists in reducing said matter to appropriate size or form, immersing the same in a closed container in a liquid of vegetable origin composed essentially of the same substances as that of the matter to be obtained from said mass, and having a sufficiently high boiling point to withstand the heat necessary to effect the destructive distillation of said vegetable matter without reducing the volume of said liquid to an extent which will expose said vegetable matter, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating the aqueous layer from the oleaginous constituents of said condensate, substantially as specified.

6. The process of treating vegetable matter to obtain oil and other fluids therefrom, which consists in reducing said matter to appropriate size or form, immersing the same in a closed container in a liquid of vegetable origin capable of withstanding the degree of heat necessary to effect the destructive distillation of said vegetable matter without reducing the volume of said liquid to an extent which will expose said vegetable matter, and consisting essentially of the same substances as that of the oils to be extracted, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constituents of the mass into condensible fluids, and finally separating the oil from the aqueous layer of the condensate, substantially as specified.

7. The process of treating vegetable matter to obtain the oil present therein, which consists in reducing said matter to appropriate size or form, immersing the same in a closed container in an equal weight of liquid of vegetable origin capable of withstanding the degree of heat necessary to effect the destructive distillation of said vegetable matter without reducing the volume of said liquid to an extent which will expose said vegetable matter, and consisting essentially of the same substances as that of the oils to be extracted, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating said oils from the heavier components of said condensate, substantially as specified.

8. The process of treating vegetable matter to obtain the oils of the terpene series present therein, which consists in reducing said matter to appropriate size or form, immersing the same in a closed container in a liquid capable of withstanding the degree of heat necessary to effect the destructive distillation of said vegetable matter without reducing the volume of said liquid to an extent which will expose said vegetable matter and composed essentially of oils of the terpene series, subjecting the same to the action of heat to effect the destructive distillation of said vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating said oils from the heavier components of said condensate, substantially as specified.

9. The process of treating pine wood or other resinous vegetable matter to obtain the turpentine, pine oil and resinous matters present therein, which consists in reducing said pine wood or vegetable matter to appropriate size or form, immersing the same in a closed container in an equal weight of liquid of vegetable origin having a sufficiently high boiling point to withstand the heat necessary to effect the destructive distillation of said wood or vegetable matter without reducing the volume of said liquid to an extent which will expose said wood or vegetable matter, subjecting the same to the action of heat to effect the destructive distillation of said wood or vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating said turpentine, pine oil, and resinous matter from the heavier components of said condensate, substantially as specified.

10. The process of treating pine wood or other resinous vegetable matter to obtain the turpentine, pine oil and resinous matter present therein, which consists in reducing said pine wood or vegetable matter to appropriate size or form, immersing the same in a closed container in an equal weight of liquid capable of withstanding the degree of heat necessary to effect the destructive distillation of said pine wood or vegetable matter without reducing the volume of said liquid to an extent which will expose said vegetable matter and consisting essentially of pine oil, pine tar oil and resinous derivatives of pine wood or of said resinous vegetable matter, subjecting the same to the action of heat to effect the destructive distillation of said pine wood or vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating said turpentine, pine oil and resinous matter from the heavier components of said condensate, substantially as specified.

11. The process of treating pine wood or other resinous vegetable matter to obtain the turpentine, pine oil and resinous matter present therein, which consists in reducing said pine wood or other vegetable matter to appropriate size or form, immersing the same in a closed container in an equal weight of liquid consisting essentially of pine oil, pine tar oil and resinous derivatives of pine wood and having a sufficiently high boiling point to withstand the heat necessary to effect the destructive distillation of said wood or vegetable matter without reducing the volume of said liquid to an extent which will expose said wood or other vegetable matter, subjecting the same to the action of heat to effect the destructive distillation of said wood or other vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating said turpentine, pine oil and resinous matter from the heavier components of said condensate, substantially as specified.

12. The process of treating pine wood or other resinous vegetable matter to obtain the turpentine, pine oil and resinous matter present therein, which consists in reducing said pine wood or vegetable matter to appropriate size or form, immersing the same in a closed container in an equal weight of liquid consisting essentially of pine oil, pine tar oil and resinous derivatives of pine wood and having a sufficiently high boiling point to withstand the heat necessary to effect the destructive distillation of the wood or vegetable matter without reducing the volume of said liquid to an extent which will expose said wood or vegetable matter, subjecting the same to a temperature of approximately 700° F. for about one hour to effect the destructive distillation of said wood or vegetable matter and the reduction of the solid carbonaceous matter to such state of fine sub-division as to cause said carbonaceous matter to become suspended in said liquid, converting the volatilizable constituents of the mass into condensible fluids, condensing said fluids, and finally separating said turpentine, pine oil and resinous matters from the heavier components of said condensate, substantially as specified.

Signed at the city of New York, in the county and State of New York, this sixth day of April, one thousand nine hundred and twenty-two.

TALIAFERRO J. FAIRLEY.

Witnesses:
CONRAD A. DIETERICH,
JOSEPH G. QUINN, Jr.